United States Patent
Braun et al.

(10) Patent No.: US 10,914,477 B2
(45) Date of Patent: Feb. 9, 2021

(54) DEVICE FOR PROVIDING CLEAN AIR IN A BEVERAGE FILLING PLANT

(71) Applicant: KRONES AG, Neutraubling (DE)

(72) Inventors: Franz Braun, Neutraubling (DE);
Holger Mueller, Neutraubling (DE);
Juergen Soellner, Neutraubling (DE);
Max Brikmann, Neutraubling (DE)

(73) Assignee: KRONES AG, Neutraubling (DE)

( * ) Notice: Subject to any disclaimer, the term of this patent is extended or adjusted under 35 U.S.C. 154(b) by 224 days.

(21) Appl. No.: 15/580,259

(22) PCT Filed: Sep. 12, 2016

(86) PCT No.: PCT/EP2016/071392
§ 371 (c)(1),
(2) Date: Dec. 6, 2017

(87) PCT Pub. No.: WO2017/042376
PCT Pub. Date: Mar. 16, 2017

(65) Prior Publication Data
US 2018/0172292 A1 Jun. 21, 2018

(30) Foreign Application Priority Data

Sep. 11, 2015 (DE) .................... 20 2015 104 817 U

(51) Int. Cl.
*F24F 3/16* (2006.01)
*B67C 3/22* (2006.01)
(Continued)

(52) U.S. Cl.
CPC .............. *F24F 3/161* (2013.01); *B67C 3/22* (2013.01); *F24F 3/14* (2013.01); *F24F 3/16* (2013.01);
(Continued)

(58) Field of Classification Search
CPC ........ F24F 3/161; F24F 3/14; F24F 3/16; F24F 2003/144; B67C 3/22; B67C 2003/227; B67C 2003/228; B29C 2049/4632
(Continued)

(56) References Cited

U.S. PATENT DOCUMENTS 3,239,305 A * 3/1966 Gennady ................... F24F 3/16
96/57
4,923,352 A * 5/1990 Tamura .................. B25J 21/005
29/722
(Continued)

FOREIGN PATENT DOCUMENTS

CN   102221248 A   10/2011
CN   102917956 A   2/2013
(Continued)

OTHER PUBLICATIONS

EP 1645813 English Translation (Year: 2006).*
(Continued)

*Primary Examiner* — Steven B McAllister
*Assistant Examiner* — Allen R Schult
(74) *Attorney, Agent, or Firm* — Haynes and Boone, LLP

(57) ABSTRACT

A device for providing clean air in a beverage filling plant is described. The device includes an inflow channel with at least one filter for pretreating the air sucked in via a supply-air feed. The inflow channel is adjoined by a first outflow channel with at least one filter for treating the air pretreated in the inflow channel for feeding into a filling cleanroom of the beverage filling plant. The inflow channel is adjoined by a second outflow channel for treating the air pretreated in the inflow channel for feeding into a blowing cleanroom for the blow-molding of plastic containers. A dehumidifying device for dehumidifying the pretreated air is arranged in the second outflow channel.

18 Claims, 2 Drawing Sheets

(51) Int. Cl.
*F24F 3/14* (2006.01)
*B29C 49/46* (2006.01)

(52) U.S. Cl.
CPC .......... *B29C 2049/4632* (2013.01); *B67C 2003/227* (2013.01); *B67C 2003/228* (2013.01); *F24F 2003/144* (2013.01)

(58) Field of Classification Search
USPC ........................................ 454/187
See application file for complete search history.

(56) References Cited

U.S. PATENT DOCUMENTS

| | | | | |
|---|---|---|---|---|
| 2007/0066205 | A1* | 3/2007 | Ohmura | F24F 3/161 454/66 |
| 2011/0217404 | A1* | 9/2011 | Dubus | D01D 5/0985 425/66 |
| 2012/0118147 | A1* | 5/2012 | Claridge | B01D 53/268 95/52 |

FOREIGN PATENT DOCUMENTS

| | | |
|---|---|---|
| CN | 202719697 U | 2/2013 |
| CN | 104329734 A | 2/2015 |
| CN | 204329191 U | 5/2015 |
| DE | 202004001619 | 5/2004 |
| EP | 1645813 | 4/2006 |
| EP | 2116353 | 11/2009 |
| EP | 2578504 | 4/2013 |
| KR | 20120101787 A | 9/2012 |

OTHER PUBLICATIONS

CN201680033696.5 First Office Action dated Jul. 3, 2019, 18 pages.
CN 201680033696.5 Office Action with English translation dated Jan. 17, 2020, 17 pages.

* cited by examiner

DEVICE FOR PROVIDING CLEAN AIR IN A BEVERAGE FILLING PLANT

CROSS REFERENCE TO RELATED APPLICATIONS

This application is a national stage of International Application No. PCT/EP2016/071392, filed Sep. 12, 2016, which claims priority from German Patent Application No. 20 2015 104 817.3 filed on Sep. 11, 2015 in the German Patent and Trademark Office, the disclosures of which are incorporated herein by reference in their entirety.

BACKGROUND

Technical Field

The present invention relates to a device for providing clean air in a beverage filling plant, wherein the clean air is typically fed into a filling cleanroom, in which a container to be filled is filled with the beverage.

Related Art

It is known to feed clean air into various areas of beverage filling plants, wherein it is known to feed clean air into a filling cleanroom, in which are disposed at least one filling element and an apparatus for supplying containers that are to be filled. By this means, improved hygiene can be achieved in the cleanroom, and in particular it is possible to reduce the entry of foreign substances and microorganisms into the containers that are to be filled and the beverages that are filled, so that an improvement is achieved in the overall hygienic quality of the filling.

The clean air in a filling cleanroom is usually provided at a slight positive pressure, so that the entry of particles and microorganisms from outside can be reduced or prevented, particularly also in the area of the airlocks, via which containers to be filled are supplied, or filled containers are conveyed out of the cleanroom. In other words, a constant flow of clean air into the filling cleanroom is provided, wherein the clean air then flows out of the cleanroom via all of its apertures, and a hygiene seal is thereby provided. In this manner, hygiene during the filling process can be improved.

Differing classes of cleanroom are known. These usually achieve, by means of differing filter devices, reductions in the airborne particles in accordance with the cleanroom class, and the air is then fed into the cleanroom.

In beverage filling plants, it is known to provide a device for supplying clean air, by means of which clean air can be prepared and introduced into the cleanroom of the beverage filling plant. Such devices are for example installed in beverage filling plants by KRONES AG as "Air Handling Units", wherein, by means of filters, the Air Handling Unit provides air of the appropriate quality for feeding into the cleanroom.

It is further known that clean air can also be supplied to the area in a beverage filling plant in which plastics are processed, for example in which plastic containers are blow-molded. In this case, the clean air is used, among its other uses, as blower air in the blow molding of plastic containers from heated preforms.

Additionally, the blowing cleanroom, which accommodates those parts of the plastic processing that are relevant to hygiene, is charged and rinsed with clean air, in order here too to prevent the entry of particles and microorganisms, and accordingly enable the plastic containers that are to be filled to be supplied hygienically. For the processing of plastic, however, dry air must be provided, in order to avoid the formation of water vapor and the condensation of water.

SUMMARY

The present disclosure describes a device for providing clean air in a beverage filling plant which enables a more efficient design of the beverage filling plant.

A device for providing clean air in a beverage filling plant, including an inflow channel with at least one filter for pretreating the air sucked in via a supply-air feed, is described, wherein the inflow channel is adjoined by a first outflow channel with at least one filter for treating the air pretreated in the inflow channel for feeding into a filling cleanroom of the beverage filling plant. The inflow channel is adjoined by a second outflow channel for treating the air pretreated in the inflow channel for feeding into a blowing cleanroom for the blow-molding of plastic containers, wherein a dehumidifying device for dehumidifying the pretreated air is arranged in the second outflow channel.

Due to the fact that the inflow channel is adjoined by a second outflow channel for treating air for feeding into a blowing cleanroom for the blow-molding of plastic containers, wherein the second outflow channel is provided with a dehumidifying device for dehumidifying the air, it is possible to provide a compact device which, via the first outflow channel, supplies clean air which is provided for charging a filling cleanroom for hygienic filling of beverages, and in addition, via the second outflow channel, supplies dried clean air which is provided for use in the blowing cleanroom of a beverage filling plant.

A particularly efficient design results from, among other factors, the fact that the inflow channel, with its filter or plurality of filters, can be shared by the first and second outflow channels. As a result, in order to supply two differing types of air, only a single inflow channel is needed, and correspondingly only a single pretreatment of the air needs to be performed by the filters disposed in the inflow channel. Thus the inflow channel and the units within it, such as for example the filters and the central fan, which is also, in various embodiments provided in the inflow channel, and which conveys the pretreated air to both the first and the second outflow channels, need to be provided only once, and can accordingly be used efficiently for both types of air.

This makes it possible to save not only additional components but also installation space, so that the device has lower overall installation space requirements than the arrangements known in the state of the art which provide two separate apparatuses for treating the air, one for the filling cleanroom and one for the blowing cleanroom.

Accordingly, the inflow channel typically includes a central fan, which conveys the air supplied via the supply-air feed through the inflow channel and also through the first outflow channel and the second outflow channel. Thus by means of a single central fan, it can be achieved that the two different types of air are supplied and conveyed, which results in higher efficiency and a lower installation space requirement.

In order to achieve adequate pretreatment of the air in the inflow channel, the inflow channel, in several embodiments includes at least one coarse dust filter and/or at least one fine dust filter. In particular, the coarse dust filter can be a filter of filter class G3 or G4, and the fine dust filter can be a filter of filter class M5 to F9. By means of this filtering technology a pretreatment of the air in the inflow channel can be achieved.

In various embodiments, in the inflow channel a first fine dust filter of filter class M5 or M6 is provided, and downstream of the first fine dust filter a second fine dust filter of filter class F7 to F9 is provided. By thus filtering in stages, adequate pretreatment of the sucked-in ambient air can take place in an efficient manner.

The components that emit noise can be damped by the provision of a sound damper for damping the sound in the inflow channel, wherein the sound damper is, in certain embodiments, disposed downstream of a coarse dust filter, in order to avoid contamination of the sound damper by coarse dust particles.

In the first outflow channel, a heat exchanger is generally provided, by means of which the air that is treated in the first outflow channel can be brought to a temperature which enables the desired temperature to be achieved in the filling cleanroom.

In order to achieve clean filtration of the air, a suspended matter filter is, in some embodiments, provided in the first outflow channel, wherein the suspended matter filter is, in several embodiments, a filter of filter class E10 to U16, for example of filter class H13 or H14.

Additionally, a sterilization device is, in some embodiments, provided in the first outflow channel for sterilizing the areas of the first outflow channel that are downstream of the sterilization device, in particular for sterilizing a suspended matter filter disposed downstream of the sterilization device, wherein the sterilization device is, for example, an $H_2O_2$ injector. By this means, when cleaning or sterilization of the beverage filling plant is performed, the sterilization of all areas exposed to the sterilization medium can be achieved.

The second outflow channel also, in certain embodiments includes a heat exchanger arranged after the dehumidifying unit, in order by this means to bring the dried clean air that is supplied to the blowing cleanroom to a temperature which provides the desired temperature in the blowing cleanroom.

The second outflow channel also typically includes a sterilization device for sterilizing the areas of the second outflow channel that are downstream of the sterilization device, and in particular for sterilizing a suspended matter filter disposed downstream of the sterilization device, wherein the sterilization device is in some embodiments, an $H_2O_2$ injector.

In order finally to achieve the clean filtration of the air, the second outflow channel in some embodiments also includes a suspended matter filter, wherein the suspended matter filter is, for example, a filter of filter class E10 to U16, and in particular of filter class H13 or H14.

A particularly simple design of the dehumidifying device can include an air cooler and a droplet separator.

In order to achieve an efficient airflow, the first outflow channel and the second outflow channel generally issue from the inflow channel parallel to each other.

A compact design, which also achieves simplified integration in a beverage filling plant and simplifies maintenance, can be achieved in that the inflow channel, the first outflow channel and the second outflow channel are accommodated in a common housing.

In particular, all units, filters, the inflow channel, and the two outflow channels are provided in a single housing, so that the total required installation space can be reduced and a compact design of the device can be achieved, in that additional structural measures in the design of a beverage filling plant can be dispensed with.

An even more compact design of the air inflow and outflow technology in the beverage filling plant results if an exhaust air fan is provided for discharging air from the blowing cleanroom or the filling cleanroom, wherein the exhaust air fan is, in various embodiments, disposed in a common housing of the device.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs. In order to avoid redundancy, repeated description of these elements is in part dispensed with in the description below.

Figure 1:
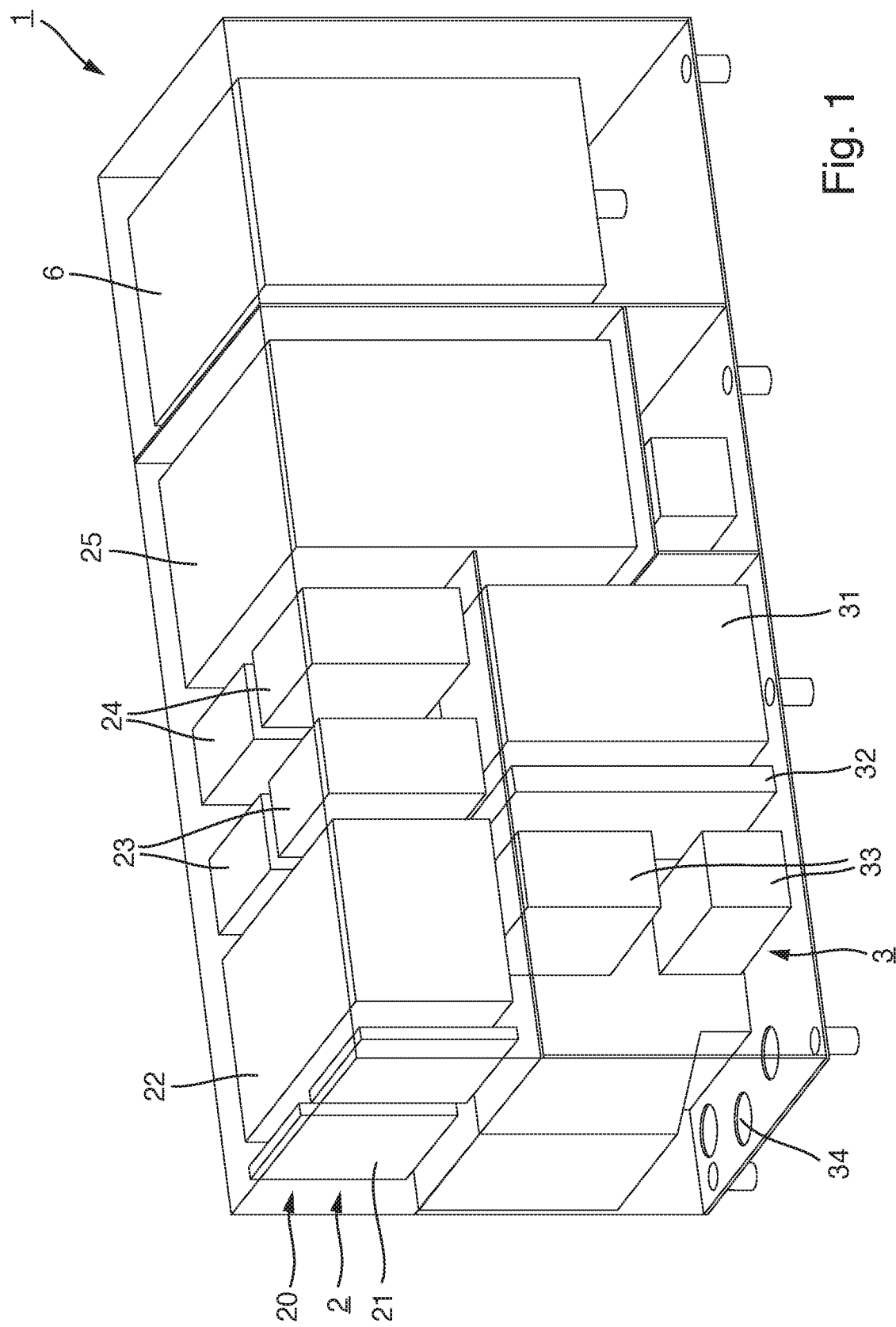
FIG. 1 is a schematic perspective representation of a device for providing clean air, in which the side walls are shown as transparent, viewed from a first side.
Figure 2:
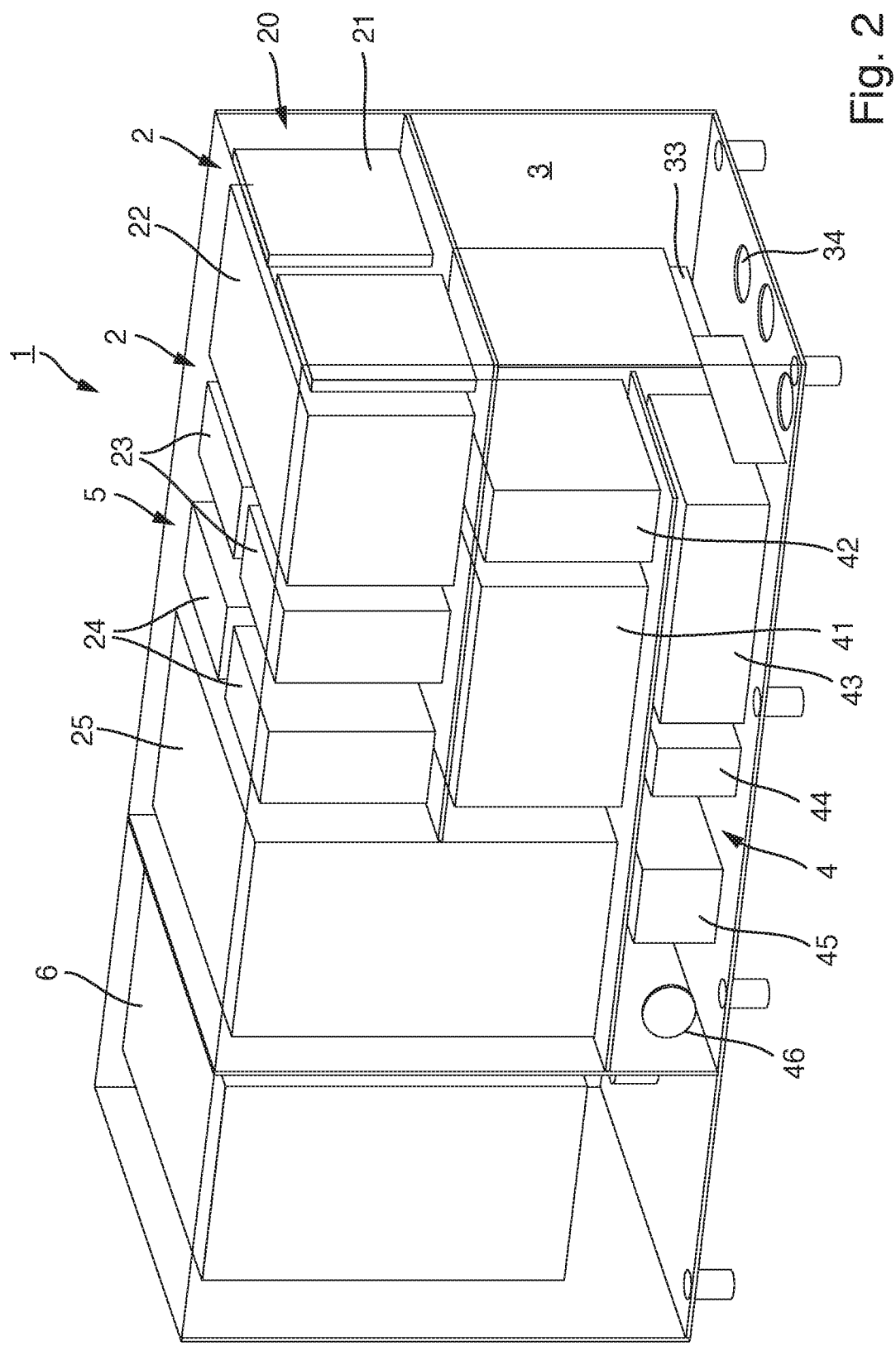
FIG. 2 is the device from FIG. 1, viewed from the other side.

FIG. 1 shows schematically a device 1 for providing clean air in a beverage filling plant, in a first representation in which the outer walls of the device are indicated only schematically, as if they were transparent. In FIG. 2, this device 1 is shown from the other side, with the side walls again represented as if they were transparent.

An inflow channel 2 is provided, which sucks in ambient air via a supply-air feed 20. The ambient air is then prefiltered by a first coarse dust filter 21. The air which has been prefiltered in the coarse dust filter 21 is then conducted through a sound damper 22, in order to prevent flow-generated noise and noise from a downstream central fan 25 from penetrating via the supply-air feed 20 into the surroundings. The central fan 25 is disposed in the inflow channel 2.

The coarse dust filter 21 is, for example, a filter of filter class G3 or G4, in order to enable the filtering out of particles >10 μm that are present in the surroundings.

The air is then further pretreated by means of a first fine dust filter 23 and a second fine dust filter, after which it is conducted to a central fan 25. The first fine dust filter 23 is generally provided as a filter of filter class M5 or M6, and the second fine dust filter 24, which is disposed downstream of the first fine dust filter 23, is typically a filter of filter class F7 to F9. In this manner, particles between 1 and 10 μm can be filtered out of the pretreated air before the air is fed to the central fan 25.

Accordingly, ambient air can be fed from the supply-air feed 20 via the filters 21, 23 and 24 to the central fan 25. Downstream of the central fan 25, the air that has been pre-cleaned by the filters 21, 23 and 24 can thus be supplied for the subsequent treatment.

The inflow channel 2 is adjoined by a first outflow channel 3 and a second outflow channel 4. The first outflow channel 3 can be particularly easily recognized in FIG. 1, and the second outflow channel 4 can be particularly easily recognized in FIG. 2.

In the example embodiment that is shown, the inflow channel 2 passes directly into the first outflow channel 3 and the second outflow channel 4. The first outflow channel 3 and the second outflow channel 4 issue from the inflow channel 2 substantially parallel to each other, so that an efficient airflow results. The air that has been pretreated by means of the filters 21, 23 and 24 is accordingly supplied by the central fan 25 to the first outflow channel 3 and the second outflow channel 4.

The first outflow channel 3 receives the pretreated air, propelled by the central fan 25, which is supplied from the inflow channel 2, and guides the air first through a heat exchanger 31. The heat exchanger 31 serves to bring the pretreated air to a temperature which enables the desired temperature in the filling cleanroom of the beverage filling plant to be achieved. Accordingly, in the heat exchanger 31 the pretreated air is cooled or heated such that, when it reaches the filling cleanroom, it can provide the temperature that is desired there. In this, the quantity of heat added or removed by the various conduits is also taken into account in the determination of the temperature. It is also taken into account that the units provided in the inflow channel 2, particularly the central fan 25, heat the pretreated air, and this quantity of heat may have to be subsequently removed.

Downstream of the heat exchanger 31, a sterilization device 32 is provided, here in the form of an $H_2O_2$ injector. The sterilization device 32 enables, for example by the introduction of gaseous $H_2O_2$, all parts of the outflow channel 3 that are downstream of the sterilization device 32, and all conduits that extend to the filling cleanroom, to be exposed to the sterilization medium. In this manner, reliable sterilization of these areas can be achieved when, for example, the beverage filling plant is operated in a cleaning or sterilization mode.

It is furthermore possible, by means of an appropriate dosing of gaseous $H_2O_2$ from the sterilization device 32, also to charge the entire filling cleanroom with the sterilization medium, in order thereby to achieve comprehensive sterilization not only of the relevant areas of the device 1 for providing the clean air, but also of the filling cleanroom of the beverage filling plant itself.

The sterilization device 32 is adjoined by a suspended matter filter 33, wherein the suspended matter filter 33 is generally a filter of filter class E10 to E16, in particular of filter class H13 or H14. By means of the suspended matter filter, which serves as a final filter for the supply of clean air to the filling cleanroom, appropriately treated clean air can be fed to the filling cleanroom.

The appropriately treated clean air is then passed via outflow apertures 34 to a line system which supplies the clean air that was cleaned in the first outflow channel 3 to the filling cleanroom of the beverage filling plant.

FIG. 2 shows the second outflow channel 4, which also adjoins the inflow channel 2, and into which is fed pretreated air, conducted via the inflow channel 2 by means of the central fan 25. The inflow channel 2 is adjoined, in the second outflow channel 4, by an air cooler 41, which is adjoined by a droplet separator 42. The air cooler 41 and the droplet separator 42 together form a dehumidifying device for dehumidifying the pretreated air. Thus by means of the air cooler 41 and the droplet separator 42, drying of the air is possible, so that the air fed in via the inflow channel 2 contains more moisture than the air that is present in the outflow channel 4 downstream of the dehumidifying device. The drying effect that is actually achieved depends on the cooling performance of the air cooler 41 and the separation performance of the droplet separator 42.

The air cooler 41 and the droplet separator 42 are adjoined in the second outflow channel 4 by a heat exchanger 43, by means of which the air which is finally fed into the blowing cleanroom is brought to the temperature that is desired there.

Here too, the heat exchanger 43 is adjoined by a sterilization device 44, by means of which, for example, gaseous $H_2O_2$ can be introduced into the dried air, in order to achieve, in a cleaning and/or sterilization operation of the beverage filling plant, the sterilization at least of the areas of the second outflow channel 4 that are downstream of the sterilization device 44, and, in various embodiments, also of the lines and cleanroom areas further downstream.

A suspended matter filter 45, in certain embodiments, adjoins the sterilization device 44, wherein the suspended matter filter 45 is, in several embodiments, a filter of filter class E10 to U16, for example of filter class H13 or H14. By means of the suspended matter filter 45, ultrapure filtration of the dried air can be achieved, so that the degree of cleanliness intended for the blowing cleanroom can be achieved.

The dried clean air is then passed via the outflow aperture 46 to a suitable line system which then conducts the dried clean air into the blowing cleanroom, in which the dried clean air can then be used, for example, for blow molding, and/or to flow over the blowing area, in order also to meet the applicable hygiene requirements in this area.

All units are generally provided in a single housing 5, as shown in FIGS. 1 and 2. Accordingly, the two differing types of clean air can both be supplied by means of the device 1, wherein the device 1 can be considerably reduced in size by comparison with the conventional arrangements, which include at least two different devices.

An exhaust air fan 6 can also be provided in the housing 5, by means of which, for example, air can be extracted from the blowing cleanroom or the filling cleanroom, and then, after suitable post-treatment, can be returned to the surroundings. This is of particular importance if a sterilization means, for example gaseous $H_2O_2$, has been introduced via the sterilization devices into the blowing cleanroom or the filling cleanroom, and must then be extracted in a manner that excludes the possibility of danger to staff in the bottling hall.

In this form too, particularly in conjunction with the exhaust air fan 6, which is also disposed in the common housing 5, a particularly compact design can be achieved.

To the extent applicable, all individual features described in the individual example embodiments can be combined with each other and/or exchanged, without departing from the field of the invention.

The invention claimed is:

1. A device for providing clean air in a beverage filling plant, comprising
   an inflow channel with at least a first filter configured to pretreat air sucked in via a supply-air feed;
   a first outflow channel with at least a second filter configured to treat the pretreated air and to feed the treated pretreated air into a filling cleanroom of the beverage filling plant; and
   a second outflow channel configured to convey the air pretreated by the first filter, but not the second filter, and to feed the treated pretreated air into a blowing cleanroom for blow-molding of plastic containers,
   wherein the inflow channel is adjoined by the first outflow channel and the second outflow channel, and
   wherein a dehumidifying device configured to dehumidify the pretreated air is arranged in the second outflow channel such that the treated pretreated air fed into the blowing cleanroom is drier than the treated pretreated air fed into the filling cleanroom.

2. The device of claim 1, wherein the inflow channel comprises a central fan that conveys the pretreated air through the inflow channel and also through the first outflow channel and the second outflow channel.

3. The device of claim 1, wherein the at least first filter comprises a first dust filter and/or a second dust filter.

4. The device of claim 3, wherein the first dust filter and the second dust filter are present, and the first dust filter comprises a filter configured to filter out particles greater than 10 μm in size, and the second dust filter comprises a filter configured to filter out particles between 1 μm and 10 μm in size.

5. The device of claim 1, wherein the inflow channel comprises a sound damper configured to damp sound.

6. The device of claim 5, wherein the sound damper is disposed downstream of the first filter comprising a first dust filter.

7. The device of claim 1, wherein the first outflow channel comprises a heat exchanger.

8. The device of claim 1, wherein the second filter comprises a suspended matter filter.

9. The device of claim 1, wherein the first outflow channel comprises a sterilization device configured to sterilize areas of the first outflow channel that are downstream of the sterilization device.

10. The device of claim 9, wherein the sterilization device is configured to sterilize a suspended matter filter downstream of the sterilization device.

11. The device of claim 9, wherein the sterilization device comprises an $H_2O_2$ injector.

12. The device of claim 1, wherein the second outflow channel comprises a heat exchanger downstream of the dehumidifying device.

13. The device of claim 1, wherein the second outflow channel comprises a sterilization device configured to sterilize areas of the second outflow channel that are downstream of the sterilization device.

14. A device for providing clean air in a beverage filling plant, comprising
   an inflow channel with at least a first filter configured to pretreat air sucked in via a supply-air feed;
   a first outflow channel with at least a second filter configured to treat the pretreated air and to feed the treated pretreated air into a filling cleanroom of the beverage filling plant; and
   a second outflow channel configured to convey the air pretreated by the first filter, but not the second filter, and to feed the treated pretreated air into a blowing cleanroom for blow-molding of plastic containers,
   wherein the inflow channel is adjoined by the first outflow channel and the second outflow channel, and
   wherein a dehumidifying device comprising an air cooler and a droplet separator is arranged in the second outflow channel such that the treated pretreated air fed into the blowing cleanroom is drier than the treated pretreated air fed into the filling cleanroom.

15. The device of claim 14, wherein the inflow channel, the first outflow channel, and the second outflow channel are accommodated in a single housing.

16. The device of claim 14, wherein the first outflow channel and the second outflow channel issue from the inflow channel parallel to each other.

17. The device of claim 14, further comprising an exhaust air fan configured to discharge air from the blowing cleanroom or the filling cleanroom.

18. The device of claim 17, wherein the exhaust air fan is disposed in a single housing of the device.

\* \* \* \* \*